United States Patent
Arakawa et al.

(10) Patent No.: US 6,829,389 B1
(45) Date of Patent: Dec. 7, 2004

(54) METHOD AND APPARATUS FOR EVALUATING IMAGE

(75) Inventors: Satoshi Arakawa, Kanagawa (JP); Kazuya Watanabe, Kanagawa (JP); Noboru Seto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/534,194

(22) Filed: Mar. 24, 2000

(30) Foreign Application Priority Data

Mar. 24, 1999 (JP) .......................................... 11-080095

(51) Int. Cl.⁷ .............................. G06K 9/68; G06K 9/36; G06K 9/00
(52) U.S. Cl. ........................ 382/218; 382/280; 382/131; 382/132
(58) Field of Search ............................... 382/141, 142, 382/143, 144, 145, 146, 147, 149, 150, 131, 132, 209, 217, 218, 274, 280; 600/410

(56) References Cited

U.S. PATENT DOCUMENTS

| | | | | |
|---|---|---|---|---|
| 5,003,979 A | * | 4/1991 | Merickel et al. ............ | 600/410 |
| 5,710,833 A | * | 1/1998 | Moghaddam et al. ....... | 382/228 |
| 6,117,601 A | * | 9/2000 | Kanazawa et al. ............ | 430/30 |
| 6,243,492 B1 | * | 6/2001 | Kamei ......................... | 382/181 |
| 6,421,553 B1 | * | 7/2002 | Costa et al. ................. | 600/476 |
| 6,427,082 B1 | * | 7/2002 | Nordstrom et al. ......... | 600/476 |

OTHER PUBLICATIONS

"An Introduction to the Quality Engineering Calculation Method" pp. 271–287, 1998.
Genichi Taguchi et al., "Robust Engineering" chapter 19, McGraw–Hill, pp. 222–224.

* cited by examiner

*Primary Examiner*—Mehrdad Dastouri
(74) *Attorney, Agent, or Firm*—Sughrue Mion, PLLC

(57) ABSTRACT

The image evaluation method and apparatus check for image abnormalities. In the method and apparatus, a Mahalanobis space is set preliminarily using a specified characteristic quantity extracted from specified image data. Then, Mahalanobis distance in the Mahalanobis space using image data read from an image to be evaluated. The calculated Mahalanobis distance is compared with a specified threshold value to check for the image abnormalities in the image to be evaluated. The method and apparatus provide a quantitative criterion in checking for abnormal image and enable image evaluation to be performed in a simple and rapid manner to realize efficient inspection.

25 Claims, 4 Drawing Sheets

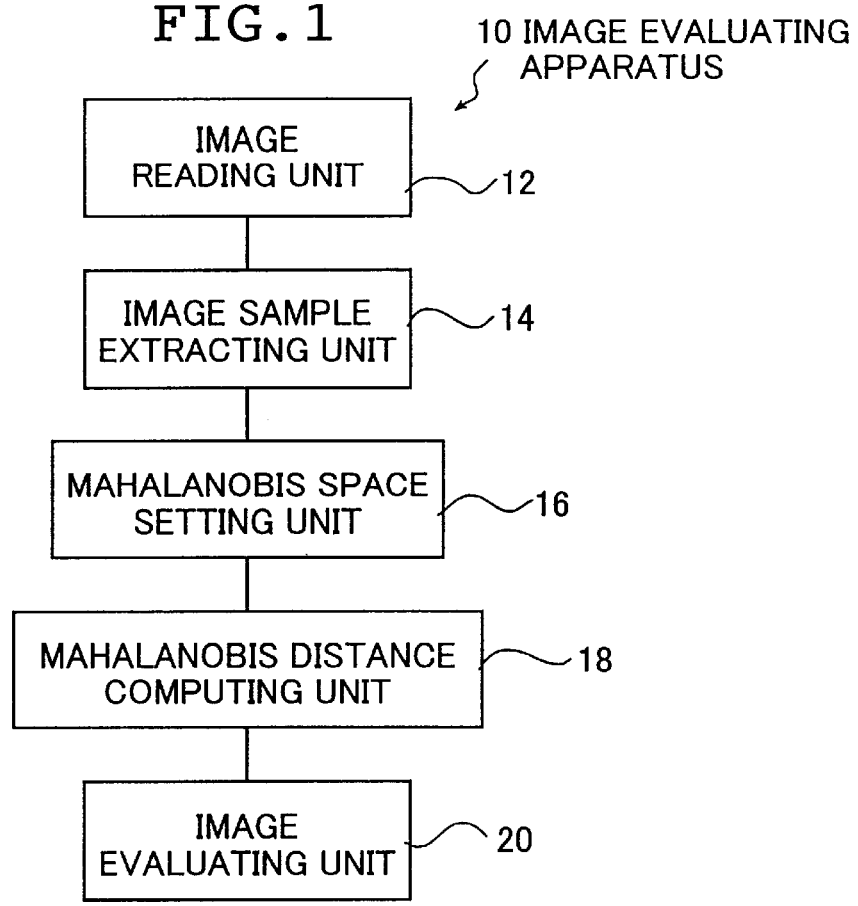

FIG. 6

| no | MD | no | MD |
|---|---|---|---|
| 38 | 51.6245 | 31 | 6.0757 |
| 39 | 28.4006 | 32 | 5.9103 |
| 43 | 9.1122 | 33 | 5.8657 |
| 19 | 9.0486 | 15 | 5.8598 |
| 30 | 7.6045 | 2 | 5.6634 |
| 11 | 7.057 | 22 | 5.6501 |
| 41 | 6.9915 | 1 | 5.5946 |
| 25 | 6.9135 | 36 | 5.5705 |
| 18 | 6.8228 | 6 | 5.46 |
| 10 | 6.7918 | 3 | 5.4142 |
| 40 | 6.7845 | 17 | 5.2799 |
| 37 | 6.7269 | 4 | 5.1423 |
| 21 | 6.6145 | 7 | 5.1414 |
| 20 | 6.6132 | 27 | 5.0782 |
| 26 | 6.6102 | 44 | 5.0219 |
| 45 | 6.5891 | 13 | 5.0214 |
| 29 | 6.5422 | 12 | 4.8872 |
| 42 | 6.4765 | 28 | 4.8248 |
| 24 | 6.4346 | 35 | 4.6799 |
| 16 | 6.4117 | 14 | 4.6583 |
| 9 | 6.3259 | 34 | 4.6321 |
| 5 | 6.24 | 8 | 4.2829 |
| 23 | 6.1112 | | |

METHOD AND APPARATUS FOR EVALUATING IMAGE

BACKGROUND OF THE INVENTION

The present invention relates to the technology of image evaluation for checking images for any abnormalities such as unevenness. In particular, the invention relates to an image evaluating method and an image evaluating apparatus for assessing unevenness in images such as radiation images and those produced with digital radiographic apparatuses.

Various diagnostic apparatuses have heretofore been used in the medical field employing X-rays and other radiations. In radiology, X-rays passing through a subject are detected and an image is generated for diagnostic purposes. Images taken by simple chest radiography have been used widely for quite many years.

Apparatuses relying upon CR (computerized radiography), CT (computerized tomography) and MRI (magnetic resonance imaging) are in commercial use. The images generated by these apparatuses are either represented on CRT (cathode ray tube) displays or output on films as by LP (laser printers) for subsequent use in medical working fields to diagnose diseases.

Radiographic and other medical diagnostic apparatus are making progressive shift toward digitizing. By the word "digitizing" is meant a process in which the X-ray signal passing through a subject is converted to a digital signal, which is appropriately processed to generate an image suitable for diagnosis.

In the apparatus for CR, there is used a stimulable phosphor which, upon illumination with a radiation, stores part of its energy and upon illumination with exciting light such as visible light or laser light, produces stimulated light emission in accordance with the stored radiation energy. The radiation image information about a subject such as the human body is first recorded in a sheet of stimulable phosphor (commonly called "a stimulable phosphor sheet"), which is then scanned with exciting light such as laser light to produce stimulated light which is read photoelectrically as an electric signal, producing a digital picture signal. The radiation image recording and reading system used in CR is also called a digital radiographic apparatus.

The digital radiographic apparatus such as the CR apparatus used for medical diagnosis have been required to produce images of extremely high quality since unevenness and other image abnormalities can be a cause of wrong diagnosis.

The causes of image abnormalities are diverse and they may originate in the apparatus itself or a certain material such as the stimulable phosphor sheet. Evaluation is sometimes performed at the critical point beyond which an image abnormality is considered to affect the reliability in diagnosis. This requires an extremely subtle distinction and has been impossible to accomplish with machines using objective and quantitative criteria. As an alternative, unevenness and other image abnormalities have so far been evaluated by human eyes using threshold samples.

However, this visual approach involves individual differences, as well as inconsistency in reproducibility. The use of comparative samples does not ensure consistent image evaluation unless the operator is highly skilled. In other words, efficiency has been very low in the conventional visual assessment.

SUMMARY OF THE INVENTION

The present invention has been accomplished under these circumstances and has as an object providing a method for image evaluation that is capable of efficient objective assessment on the basis of a quantitative criterion in checking for image abnormalities.

Another object of the invention is to provide an apparatus for implementing the method.

The first object of the invention can be attained by an image evaluation method that checks for image abnormalities, comprising the steps of preliminarily setting a Mahalanobis space using a specified characteristic quantity extracted from specified image data, calculating a Mahalanobis distance using the Mahalanobis space and image data read from an image to be evaluated, and comparing the calculated Mahalanobis distance with a specified threshold value to check for the image abnormalities in the image to be evaluated.

Preferably, respective Mahalanobis distances in a main and an auxiliary scanning direction calculated from characteristic quantities for the image data about the image to be evaluated in the main and the auxiliary scanning direction, respectively and the respective Mahalanobis distances are compared with respective specified threshold values to check for the image abnormalities in the image to be evaluated.

Preferably, the specified characteristic quantity for forming the Mahalanobis space contains at least one of the following quantities of respective lines in the specified image data in a main or an auxiliary scanning direction, a sum, an average, a standard deviation, a Fourier transformed maximum power, a spatial frequency of the Fourier transformed maximum power, a maximum value, a minimum value and an amplitude between the maximum and minimum values.

Preferably, the specified image data and the image data read from the image to be evaluated are subjected to logarithmic conversion.

Preferably, the specified image data is read from at least one normal image which has not the image abnormalities at all.

The second object of the invention can be attained by an apparatus for evaluating images, comprising a Mahalanobis space setting unit which calculates preliminarily a specified characteristic quantity from specified image data and sets preliminarily a Mahalanobis space using the specified characteristic quantity, a Mahalanobis distance calculating unit which calculates a Mahalanobis distance using the Mahalanobis space and image data read from an image to be evaluated, and a comparing unit which compares the calculated Mahalanobis distance with a specified threshold value and thereby checks for image abnormalities in the image to be evaluated to evaluate the image.

Preferably, the specified image data is read from at least one normal image which has not the image abnormalities at all.

It is preferable that the apparatus further comprises an image reading unit which reads the specified image data and the image data from the image to be evaluated.

It is also preferable that the apparatus further comprises an extracting unit which extracts image samples from the specified image data and the image data from the image to be evaluated image data read by the image reading unit.

BRIEF DESCRIPTION OF THE DRAWINGS

FIG. 1 is a block diagram showing schematically an image evaluating apparatus according to an embodiment of the invention;

FIG. 2 illustrates a sample to be used in the embodiment;

FIG. 6 is a table showing the result of calculating the Mahalanobis distance on samples extracted from the data about an actual image to be evaluated.

DETAILED DESCRIPTION OF INVENTION

Figure 3:
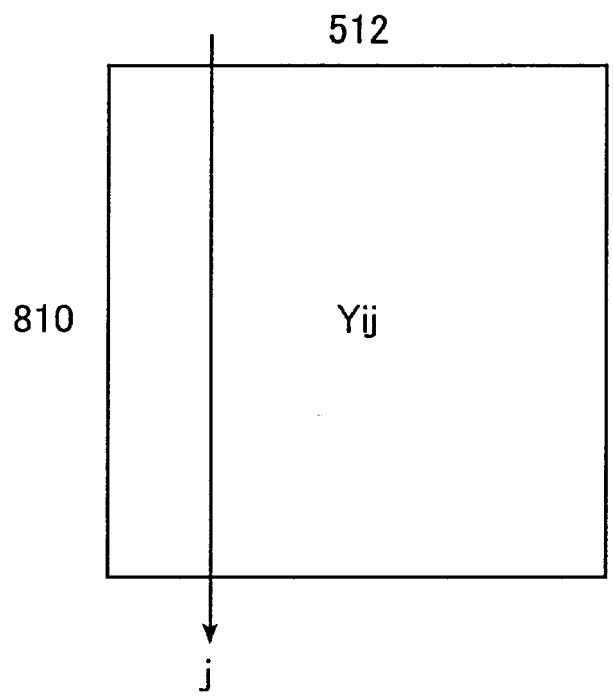
FIG. 3 illustrates a sample to be used in setting a Mahalanobis space in the embodiment.

The image evaluating method and apparatus of the invention are described below in detail with reference to the preferred embodiment shown in the accompanying drawings.

In the embodiment described below, a stimulable phosphor sheet having a radiation image recorded therein is subjected to image sampling and quantitative evaluation is performed to check for any unevenness in the recorded image.

FIG. 1 is a block diagram showing schematically an image evaluating apparatus according to the preferred embodiment of the invention which is generally indicated by 10. As shown, the image evaluating apparatus 10 comprises an image reading unit 12, a sample image extracting unit 14, a Mahalanobis space setting unit 16, a Mahalanobis distance computing unit 18, and an image evaluating unit 20.

The image reading unit 12 is a device into which the radiation image recorded in a stimulable phosphor sheet is read as digital image data. The image sample extracting unit 14 is a device by which at least one suitable image sample is extracted from the digital image data of the image read into the image reading unit 12.

The Mahalanobis space setting unit 16 is a device by which at least one specified characteristic quantity is calculated from the image samples extracted from the particular image or images, for example, the normal image or images to previously set a Mahalanobis space. The Mahalanobis space will be described later in detail. Suffice it here to say that this concept was defined in the Mahalanobis-Taguchi system (MTS or commonly called "Taguchi method") which, in the field of quality engineering, Genichi Taguchi developed using the distance conceived by an Indian statistician Mahalanobis.

The Mahalanobis distance computing unit 18 calculates the so-called "Mahalanobis distance" in a Mahalanobis space for a sample extracted from image data about the image to be evaluated that has been separately read into the image reading unit 12. The Mahalanobis distance will also be described later in detail. Suffice it here to say that this concept of the Mahalanobis distance is a measure of any abnormality in the sample to be evaluated, or how much it departs from the normal data. By calculating the Mahalanobis distance, one can evaluate image unevenness in a quantitative manner.

The image evaluating unit 20 evaluates image abnormalities such as image unevenness by comparing the calculated Mahalanobis distance with a specified threshold value.

On the pages that follow, the process of implementing the preferred embodiment is described in detail by citing a specific example. It starts with collecting the necessary image samples for setting a Mahalanobis space. The Mahalanobis space serves as a reference for evaluating image abnormalities and is also known as the reference space. In short, it is a collection of the normal data which should serve as a reference for evaluation.

In the embodiment under consideration, an ST type of the stimulable phosphor sheet (ST-$V_N$ type imaging plate manufactured by Fuji Photo Film Co., Ltd.) is employed and for easy detection of abnormalities, X-rays were applied in greater-than-usual dose of 10 mR. In order to collect the normal data, normal images are used that will not produce unevenness, streaks or any other abnormalities when they are output in an ordinary film size.

The 18 pieces of such normal images are read by the image reading unit 12 to collect the normal data. In the image sample extracting unit 14, an area measuring 25.6× 25.6 mm equivalent to one image sample is sliced from one image and divided into 45 (image) samples. In total, 810 (=45×18) samples are collected.

The reading pixel density of the image data is 10 lines/mm but in the embodiment under consideration, the reading pixel density is reduced to 5 lines/mm. Therefore, 5×25.6= 128 and one image sample consists of 128×128 pieces (pixels) of image density data.

In the next step, the Mahalanobis space setting unit 16 calculates characteristic quantities from the collected 810 image samples to set a Mahalanobis space. Four characteristic quantities are adopted for the density data taken line by line from the image sample shown in FIG. 2 and they are (1) sum, (2) standard deviation, (3) Fourier transformed maximum power (amplitude), and (4) the frequency of Fourier transformed maximum power (in lines/mm). Here, for the sake of simplicity, these characteristic quantities are calculated only in the row direction (main scanning direction) as shown in FIG. 2. In practice, however, characteristic quantities are also calculated in the column direction (auxiliary scanning direction).

Each sample consisting of 128×128 pieces of image density data as shown in FIG. 2 is operated upon to calculate the four characteristic quantities per row until 128 rows are counted. In other words, 512 (=4×128) parameters (data) are calculated for each sample. Given a total of 810 samples, one yields a data matrix consisting of 810×512 elements as shown in FIG. 3. In the matrix, 512 parameters align in the row direction and 810 pieces of data align in the column direction for each parameter. Those data are normalized for each parameter as indicated by the arrow in FIG. 3.

For each parameter, the 810 pieces of data in each column j are operated upon to determine the average $m_j$ and the standard deviation $\sigma_j$ (j=1–512). Then, for each of the 810×512 pieces of data $Y_{ij}$ (i=1–810, j=1–512; see FIG. 3), normalized data $y_{ij}$ is computed by the following equation (1):

$$y_{ij}=(Y_{ij}-m_j)/\sigma_j \tag{1}$$

Figure 4:
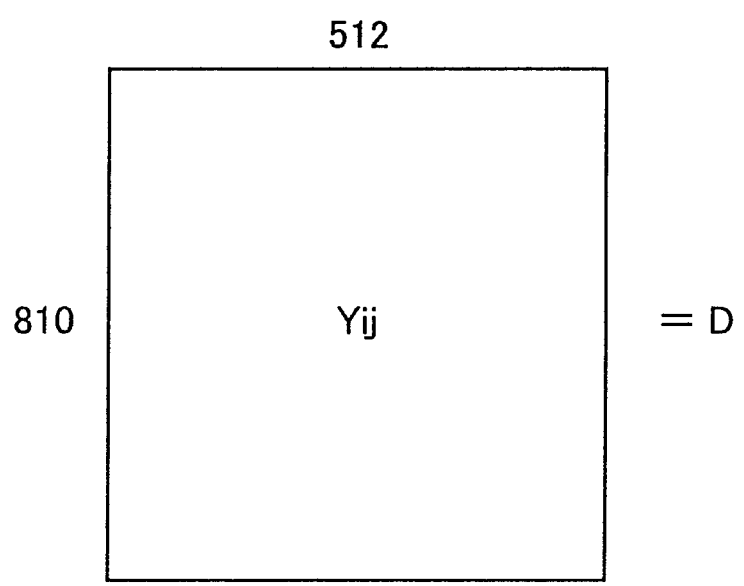
FIG. 4 illustrates data prepared by normalizing the data shown in FIG. 3.

This gives an 810×512 data matrix D (see FIG. 4) produced by normalizing the respective data shown in FIG. 3. The thus produced 810 pieces of data having 512 parameters form a reference space (Mahalanobis space).

The next step is to calculate the Mahalanobis distance MD by the Mahalanobis distance computing unit 18. To begin with, a correlation coefficient matrix R is determined from the normalized data matrix D by the following equation (2):

$$R=(1/810)D'D \tag{2}$$

where D' is the transpose of D.

The data matrix D consists of 810×512 elements and its transpose D' consists of 512×810 elements; hence, the correlation coefficient matrix R computed by equation (2) is a square matrix consisting of 512×512 elements.

We then operate on the correlation coefficient matrix R to determine its inverse $R^{-1}$. Using the inverse matrix $R^{-1}$, we define the Mahalanobis distance MD as follows. First consider the average vector $m=(m_j)$ (j=1–512) and the standard deviation vector $\sigma=(\sigma_j)$ (j=1–512). Also consider a sample vector for a given image data and express it as $x=(x_j)$ (j=1–512). Normalize this sample vector by the following equation (3) to produce a normalized sample vector $x=(x_j)$ (j=1–512):

$$x_j=(X_j-m_j)/\sigma_j \qquad (3)$$

If the normalized sample vector $x=(x_j)$ is a column vector (or a 512×1 matrix), the Mahalanobis distance MD(x) of the sample $x=(x_j)$ is given by the following equation (4):

$$MD(x)=(1/512)x'R^{-1}x \qquad (4)$$

where x' is a row vector (or a 1×512 matrix) which is the transpose of the column vector x.

Figure 5:
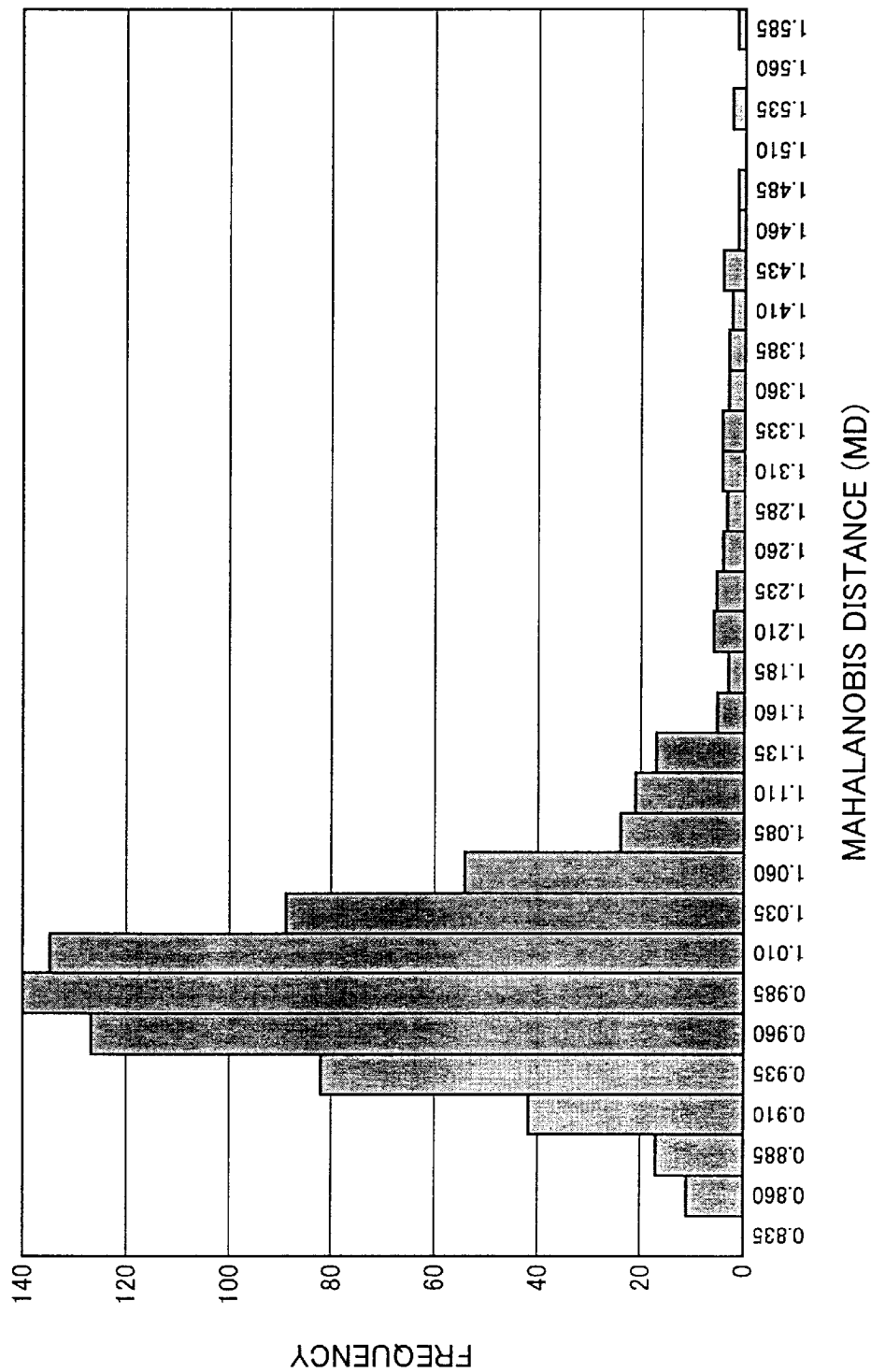
FIG. 5 is a graph showing the result of calculating the Mahalanobis distance on the sample shown in FIG. 4 used to set the Mahalanobis space.

The Mahalanobis distance may be computed for each element (sample) of the reference space and the result is shown in FIG. 5. Obviously, almost all of the 810 samples in the space have Mahalanobis distances of about 1 and no sample has a value greater than 1.6.

In the next step, the image to be evaluated is read by the image reading device 12. Different types of stimulable phosphor sheets have varying degrees of density fluctuations in the normal state and in the embodiment under consideration, same ST type of the stimulable phosphor sheet as that used at the time of the setting of the Mahalanobis space is employed. A single image having unevenness in density is output on the stimulable phosphor sheet. For sure generation of abnormalities, the apparatus may be vibrated intentionally.

The thus obtained image on the stimulable phosphor sheet is then read by the image reading device 12 at a resolution of 10 lines/mm to obtain image data. Here, the image data are also thinned out to reduce the pixel density of the image data to 5 lines/mm.

As already mentioned, an area measuring 25.6×25.6 mm corresponding to one image sample is then sliced from the resulting image data by the image sample extracting device 14 to produce 45 samples which each consist of 128×128 pixel data as shown in FIG. 2. Each of these samples is operated on by the Mahalanobis space setting device 16 for every line of density data to compute the following four characteristic quantities, sum, standard deviation, Fourier transformed maximum power, and the frequency (lines/mm) of Fourier transformed maximum power. As a result, sample vectors $A=(A_j)$ (j=1–512) are produced that each consist of 512 (=4×128) pieces of data. One sample yields one sample vector $A=(A_j)$ and 45 samples yield 45 sample vectors A.

Subsequently, each sample vector is normalized by the following equation (5):

$$a_j32\ (A_j-m_j)/\sigma_j \qquad (5)$$

Thus are produced 45 normalized sample data $a=(a_j)$ (j=1–512). The Mahalanobis distance computing unit 18 computes the Mahalanobis distance MD for each of these sample data by equation (4), provided that a is substituted for x (x=a).

The Mahalanobis distance MD is computed for each of these 45 pieces of sample data and the result is shown in FIG. 6. Obviously, the greater part of the abnormal samples with artificial unevenness in density has Mahalanobis distances of about 4–6 and can be clearly distinguished from the values of the reference space shown in FIG. 5 which consist of normal data. Therefore, in the case under consideration, the threshold beyond which the image is found to be abnormal may be set at MD of about 1.6. Once the threshold is set, the image evaluating unit 20 can perform automatic checking for any image abnormality.

Thus, according to the preferred embodiment described above, computing of the Mahalanobis distance MD provides a quantitative criterion in checking for abnormal images, thereby enabling image evaluation to be performed in an objective, simple and rapid manner.

To realize simple processing, the image data to be processed is preferably subjected to logarithmic conversion.

It should also be noted that the present invention is applicable not only to black-and-white radiation images but also to the evaluation of common film images including color images. Evaluation of color images can be performed by essentially the same procedure as applied to gray radiation images. In a first example, the color image to be evaluated is converted to a corresponding solid gray image and four characteristic quantities (sum, standard deviation, maximum amplitude and the frequency of maximum amplitude) which are the same as those used in the above-described evaluation of radiation image are determined to set the reference space, except that they are computed at the visual density. In a second example, a solid gray image is also evaluated but the characteristic quantities to be computed are the sum, standard deviation, maximum amplitude and the frequency of maximum amplitude at each of the visual, C, M and Y densities. Thus, the second example computes more characteristic quantities than the first example, the difference being equivalent to the number of the primary colors used. The advantage of using a solid gray image is that the visual density as well as the C, M and Y densities can be measured with a Macbeth densitometer.

The image evaluating apparatus of the invention may be an integral part of a digital radiographic apparatus or it may be a separate entity from the latter; in this alternative case, it evaluates the image from the digital radiographic apparatus by the processing schemes described on the foregoing pages.

While the image evaluating method and apparatus of the invention have been described above in detail, it should be understood that the invention is by no means limited to the foregoing example and that various improvements and modifications can be made without departing from the scope and spirit of the invention.

As described on the foregoing pages, the invention provides a quantitative criterion in checking for abnormal images and enables image evaluation to be performed in a simple and rapid manner to realize efficient inspection.

What is claimed is:

1. An image evaluation method that checks for image quality abnormalities, comprising the steps of:

preliminary setting a Mahalanobis space using a specified characteristic quantity extracted from specified image data;

calculating a Mahalanobis distance using said Mahalanobis space and the image data read from an image to be evaluated; and comparing the calculated Mahalanobis distance with a specified threshold value to check for image quality abnormalities in said image to be evaluated, wherein the image quality abnormalities are derived from an image system that has acquired the image data and not from abnormalities of a tissue.

2. The method according to claim 1, wherein respective Mahalanobis distances in a main and an auxiliary scanning direction calculated from characteristic quantities for the image data about said image to be evaluated in the main and the auxiliary scanning direction, respectively and said respective Mahalanobis distances are compared with respective specified threshold values to check for the image quality abnormali ties in the image to be evaluated.

3. The method according to claim 1, wherein said specified characteristic quantity for forming said Mahalanobis space contains at least one of the following quantities of respective lines in the specified image data in a main or an auxiliary scanning direction, a Fourier transformed maximum power, a spatial frequency of the Fourier transformed maximum power, a maximum value, a minimum value and an amplitude between the maximum and minimum values.

4. The method according to claim 3, wherein said specified characteristic quantity for forming said Mahalanobis space contains at least the sum.

5. The method according to claim 4, wherein said specified characteristic quantity for forming said Mahalanobis space further contains the standard deviation.

6. The method according to claim 3, wherein said specified characteristic quantity for forming said Mahalanobis space contains at least the standard deviation.

7. The method according to claim 3, wherein the specified image data is an n×m matrix and said specified characteristic quantity is extracted for each element of the n×m matrix.

8. The method according to claim 1, wherein said specified image data and said image data read from said image to be evaluated are subjected to logarithmic conversion.

9. The method according to claim 1, wherein said specified image data is read from at least one normal quality image which has not the image quality abnormalities at all.

10. The method of claim 1, wherein for the specified image data, the specified threshold is fixed value.

11. The method of claim 10, wherein the specified image data comprises data corresponding to normal data.

12. The method according to claim 1, wherein said specified characteristic quantity for forming said Mahalanobis space contains at least two of the following quantities of respective lines in the specified image data in a main or an auxiliary scanning direction, a sum, an average, a standard deviation, a Fourier transformed maximum power, a spatial frequency of the Fourier transformed maximum power, a maximum value, a minimum value and an amplitude between the maximum and minimum values.

13. The method according to claim 14, wherein the specified image data is an n×m matrix and the at least two of the following quantities of the specified characteristic quantity are extracted for each element of the n×m matrix.

14. The method according to claim 1, wherein said specified characteristic quantity for forming said Mahalanobis space contains at least a maximum value based on data in respective line and a frequency of the maximum value.

15. The method according to claim 4, wherein the maximum value is one of a maximum power value and maximum amplitude.

16. The method according to claim 1, wherein said specified characteristic quantity for forming said Mahalanobis space contains at least one of the following quantities of respective lines in the specified image data in a main or an auxiliary scanning direction, a Fourier transformed maximum power and a spatial frequency of the Fourier transformed maximum power.

17. An apparatus for evaluating images, comprising:
 a Mahalanobis space setting unit which calculates preliminarily a specified characteristic quantity from specified image data and sets preliminarily a Mahalanobis space using said specified characteristic quantity;
 a Mahalanobis distance calculating unit which calculates a Mahalanobis distance using said Mahalanobis space and image data read from an image to be evaluated; and
 a comparing unit which compares the calculated Mahalanobis distance with a specified threshold value and thereby checks for image quality abnormalities derived from an image system that has acquired the image data in said image to be evaluated and not from abnormalities of a tissue, to evaluate said image.

18. The apparatus according to claim 14, wherein said specified image data is read from at least one normal quality image which has not the image quality abnormalities at all.

19. The apparatus according to claim 6, further comprising:
 an image reading unit which reads said specified image data and said image data from said image to be evaluated.

20. The apparatus according to claim 8, further comprising:
 an extracting unit which extracts image samples from said specified image data and said image data from said image to be evaluated image data read by said image reading unit.

21. The apparatus of claim 6, wherein for the specified image data, the specified threshold is fixed value.

22. The apparatus of claim 11, wherein the specified image data comprises data corresponding to normal data.

23. The apparatus according to claim 6, wherein said specified characteristic quantity for forming said Mahalanobis space contains at least one of the following quantities of respective lines in the specified image data in a main or an auxiliary scanning direction, a Fourier transformed maximum power and a spatial frequency of the Fourier transformed maximum power.

24. An image evaluation method that checks for image quality abnormalities derived from an image system that has acquired image data, comprising the steps of:
 preliminary setting a Mahalanobis space using a specified characteristic quantity extracted from specified image data;
 calculating a Mahalanobis distance using said Mahalanobis space and the image data read from an image to be evaluated; and
 comparing the calculated Mahalanobis distance with a specified threshold value to check for the image quality abnormalities in said image to be evaluated, wherein said specified characteristic quantity for forming said Mahalanobis space contains at least one of the following quantities of respective lines in the specified image data in a main or an auxiliary scanning direction, a Fourier transformed maximum power and a spatial frequency of the Fourier transformed maximum power.

25. An apparatus for evaluating images, comprising:
 a Mahalanobis space setting unit which calculates preliminarily a specified characteristic quantity from specified image data and sets preliminarily a Mahalanobis space using said specified characteristic quantity;

a Mahalanobis distance calculating unit which calculates a Mahalanobis distance using said Mahalanobis space and image data read from an image to be evaluated; and a comparing unit which compares the calculated Mahalanobis distance with a specified threshold value and thereby checks for image quality abnormalities derived from an image system that has acquired the image data in said image to be evaluated to evaluate said image, wherein said specified characteristic quantity for forming said Mahalanobis space contains at least one of the following quantities of respective lines in the specified image data in a main or an auxiliary scanning direction, a Fourier transformed maximum power and a spatial frequency of the Fourier transformed maximum power.

* * * * *

UNITED STATES PATENT AND TRADEMARK OFFICE
CERTIFICATE OF CORRECTION

PATENT NO. : 6,829,389 B1
DATED : December 7, 2004
INVENTOR(S) : Satoshi Arakawa, Kazuya Watanabe and Noboru Seto It is certified that error appears in the above-identified patent and that said Letters Patent is hereby corrected as shown below:

Column 7,
Line 8, "abnormali ties" should read -- abnormalities --
Line 48, "according to claim 14" should read -- according to claim 12 --
Line 56, "according to claim 4" should read -- according to claim 14 --

Column 8,
Line 16, "according to claim 14" should read -- according to claim 17 --
Line 19, "according to claim 6" should read -- according to claim 17 --
Line 24, "according to claim 8" should read -- according to claim 19 --
Line 30, "according to claim 6" should read -- according to claim 17 --
Line 32, "according to claim 11" should read -- according to claim 21 --
Line 34, "according to claim 6, should read -- according to claim 17 --

Signed and Sealed this

Fifth Day of July, 2005

JON W. DUDAS
*Director of the United States Patent and Trademark Office*